United States Patent
Aalla et al.

(10) Patent No.: US 9,560,516 B2
(45) Date of Patent: Jan. 31, 2017

(54) METHOD TO USE EXISTING NAS SIGNALING CONNECTION FOR PENDING UPLINK SIGNALING/DATA AFTER TAU ACCEPT

(71) Applicant: Samsung Electronics Co., Ltd., Suwon-si, Gyeonggi-do (KR)

(72) Inventors: Kedar Santosh Kumar Aalla, Bangalore (IN); Srinivas Chinthalapudi, Bangalore (IN); Prakash Rao, Bangalore (IN); Varun Bharadwaj Santhebenur Vasudevamurthy, Bangalore (IN); Vijay Ganesh Surisetty, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 14/380,598

(22) PCT Filed: Feb. 14, 2013

(86) PCT No.: PCT/KR2013/001155
§ 371 (c)(1),
(2) Date: Aug. 22, 2014

(87) PCT Pub. No.: WO2013/125811
PCT Pub. Date: Aug. 29, 2013

(65) Prior Publication Data
US 2015/0023252 A1    Jan. 22, 2015

(30) Foreign Application Priority Data

Feb. 23, 2012  (IN) .............................. 677/CHE/2012
Jan. 31, 2013  (IN) .............................. 677/CHE/2012

(51) Int. Cl.
*H04W 8/08* (2009.01)
*H04W 76/04* (2009.01)

(52) U.S. Cl.
CPC ............. *H04W 8/08* (2013.01); *H04W 76/045* (2013.01); *H04W 76/04* (2013.01)

(58) Field of Classification Search
CPC .......... H04W 4/02; H04W 8/08; H04W 76/04; H04W 76/045; H04W 60/06; H04W 68/00; H04W 28/02; H04W 4/22; H04L 12/56
See application file for complete search history.

(56) References Cited

U.S. PATENT DOCUMENTS

2009/0247176 A1 * 10/2009 Song .................... H04W 76/068
455/450
2010/0165940 A1 * 7/2010 Watfa ...................... H04W 8/08
370/329
(Continued)

FOREIGN PATENT DOCUMENTS

EP          2509345 A1 * 10/2012 ............ H04W 4/005

*Primary Examiner* — Jae Y Lee
*Assistant Examiner* — Aixa Guadalupe-Cruz
(74) *Attorney, Agent, or Firm* — Jefferson IP Law, LLP

(57) ABSTRACT

A method and system to use existing Non-access stratum (NAS) signaling connection for pending uplink signaling/data after Tracking Area Update Procedure (TAU) complete is disclosed. The proposed method handles the EPS Session Management (ESM), Short Message Service (SMS) or voice call or data when a User Equipment (UE) is waiting for TAU accept. The method allows UE to inform the network with specific Information Element (IE) in TAU complete message, so that the network will take the next action. This will help to provide quick services to the user. Using the "CONN REQ TYPE" IE, in TAU complete, to handle all abnormal (Continued)

Cases for Circuit Switches (CS) services/data services in E-UTRAN (Evolved UTRAN) network.

22 Claims, 4 Drawing Sheets

(56) References Cited

U.S. PATENT DOCUMENTS

| | | |
|---|---|---|
| 2010/0172301 A1 | 7/2010 | Watfa et al. |
| 2010/0297979 A1 | 11/2010 | Watfa et al. |
| 2011/0013589 A1 | 1/2011 | Wu |
| 2011/0103277 A1 | 5/2011 | Watfa et al. |
| 2011/0275342 A1 | 11/2011 | Ramle et al. |

* cited by examiner

METHOD TO USE EXISTING NAS SIGNALING CONNECTION FOR PENDING UPLINK SIGNALING/DATA AFTER TAU ACCEPT

TECHNICAL FIELD

The present invention relates to wireless networks and more particularly to the method of using existing Non Access Stratum (NAS) signaling connection for pending uplink signaling/data after Tracking Area Update (TAU) procedure completes.

BACKGROUND ART

In wireless networks, a user equipment (UE) communicates through wireless links to a network of base stations or other wireless access points connected to a telecommunications network. The wireless networks have undergone rapid development through the generations of Radio Access Technology (RAT). The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

LTE is a technology proposed by 3GPP which supports high data rate (50 Mbps UL and 100 Mbps DL) and is purely packet switched (PS) system. By nature of packet switched system, they handle bursty type of data in nature. In order to support Circuit Switched (CS) services like Short Messaging Service (SMS), voice call in a multimode device capable of LTE/3G/3G, 3GPP has come up with SMS over SGs, CS Fallback mechanism to send SMS over LTE network and fall back to 2G or 3G for voice call.

In a 3GPP based 3G/2G/LTE system, during RAT change from 3G or 2G to LTE or when UE moves from one tracking area to another tracking area which does not belong to the assigned TAI list, UE will do Normal/Combined Tracking area update procedure on LTE. TAI List indicates a list of tracking areas for which the UE doesn't need to perform a tracking area updating procedure when entered one of these TAs (in the list). The TAIs in a TAI list assigned by an (Mobility Management Entity) MME to the UE belongs to the same MME area. MME may send new Globally Unique Temporary ID (GUTI) in TAU Accept and will wait for TAU complete message. In this case, when some uplink signaling or data is triggered in UE, there might be chances that UE procedure will fail after TAU procedure due to release of NAS connection by MME. This will lead to delay in connection establishment to get the service.

Current 3GPP specification does not specify how to use existing NAS signaling connection for some pending uplink signaling like UE SMS/UE call/UE data in LTE when UE is waiting for TAU accept and active flag has not set in TAU request sent in IDLE mode.

Due to abovementioned reasons, it is evident that the existing methods fail to handle pending signaling or data by using existing NAS signaling connection which was established for TAU procedure, when UE is waiting for TAU accept.

DISCLOSURE OF INVENTION

Solution to Problem

The principal object of the embodiments herein is to provide a method and system to use existing NAS signaling connection for pending uplink signaling/data after Tracking Area Update (TAU) procedure completes.

Another object of the invention is to provide an information element in TAU complete message.

Another object of the invention is to provide an information element in TAU complete message with active flag set to '0' and '1' to keep existing connection with MME.

Accordingly the invention provides a method to use existing Non-access stratum (NAS) signaling connection for at least one of: pending uplink signaling, data when an User Equipment (UE) is waiting for Tracking Area Update (TAU) accept from a network, wherein the method comprises generating an information element (IE) in TAU complete message to the network by the UE. Then the method sends the IE with a value in the TAU complete message to retain the existing signaling connection.

Accordingly the invention provides a User Equipment (UE) to use existing Non-access stratum (NAS) signaling connection for at least one of: pending uplink signaling, data when the UE is waiting for Tracking Area Update (TAU) accept from a network, wherein the UE comprises an integrated circuit. Further the integrated circuit comprises at least one processor, at least one memory. The memory comprises a computer program code within the circuit. At least one memory and the computer program code with the at least one processor cause the UE to generate an information element (IE) in TAU complete message to the network. Further the UE is configured to send the IE with a value in the TAU complete message to retain the existing signaling connection.

Accordingly the invention provides a network to retain existing Non-access stratum (NAS) signaling connection for at least one of: pending uplink signaling, data during Tracking Area Update (TAU) accept procedure, wherein the network comprises at least one User Equipment (UE). Further the network is configured to receive an Information Element (IE) with a value as '0' in TAU complete message from the UE without establishing radio bearers. Also the network is configured to receive an Information Element (IE) with a value as '1' in the TAU complete message from the UE to establish radio bearers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Figure 1:
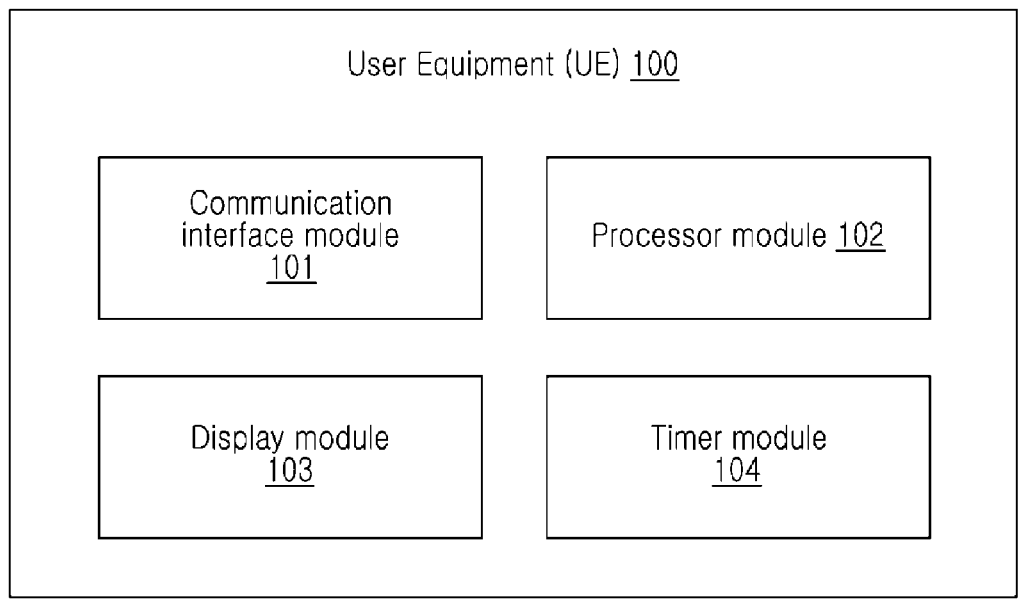
FIG. 1 illustrates the block diagram of user equipment (UE) with various modules, according to embodiments as disclosed herein, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system to handle SMS or call or data when UE is waiting for TAU (Tracking Area Update) accept message from Mobility Management Entity (MME). The method checks for the state of the UE, based on that the method informs network to keep the existing connection for the pending signaling procedures.

In an embodiment, UE informs network with specific Information Element (IE) in TAU complete so that MME will take the next action. This helps to provide quick services to the user of the UE.

In an embodiment, the method proposes a "CONN REQ TYPE" IE in TAU complete to handle all abnormal cases for CS services/data services in E-UTRAN network.

The proposed invention is applicable only if Radio Access Bearers (RAB) establishment does not happen during TAU procedure.

Referring now to the drawings, and more particularly to FIGS. 1 through 4, where similar reference characters denote corresponding features consistently throughout the figures, there are shown preferred embodiments.

FIG. 1 illustrates the block diagram of user equipment (UE) with various modules, according to embodiments as disclosed herein. As depicted in the figure, the user equipment 100 comprises a communication interface module 101, a processor module 102, a display module 103 and a timer module 104. The communication interface module 101 helps the UE 100 to connect to the access network. The processor module 102 is executed with set of instructions that are stored in a memory. The battery information comprises the amount of charge that the UE device posses and the time period for which the user equipment 100 will be in operation and so on. The display module 103 of the user equipment 100 comprises of a user interface which can be a key pad or through any other means by which a user can input some data into the user equipment 100. The timer module 104 calculates the elapsed time in which the UE has made reselection or handovers. For example, the timer can be T3440.

Figure 2:
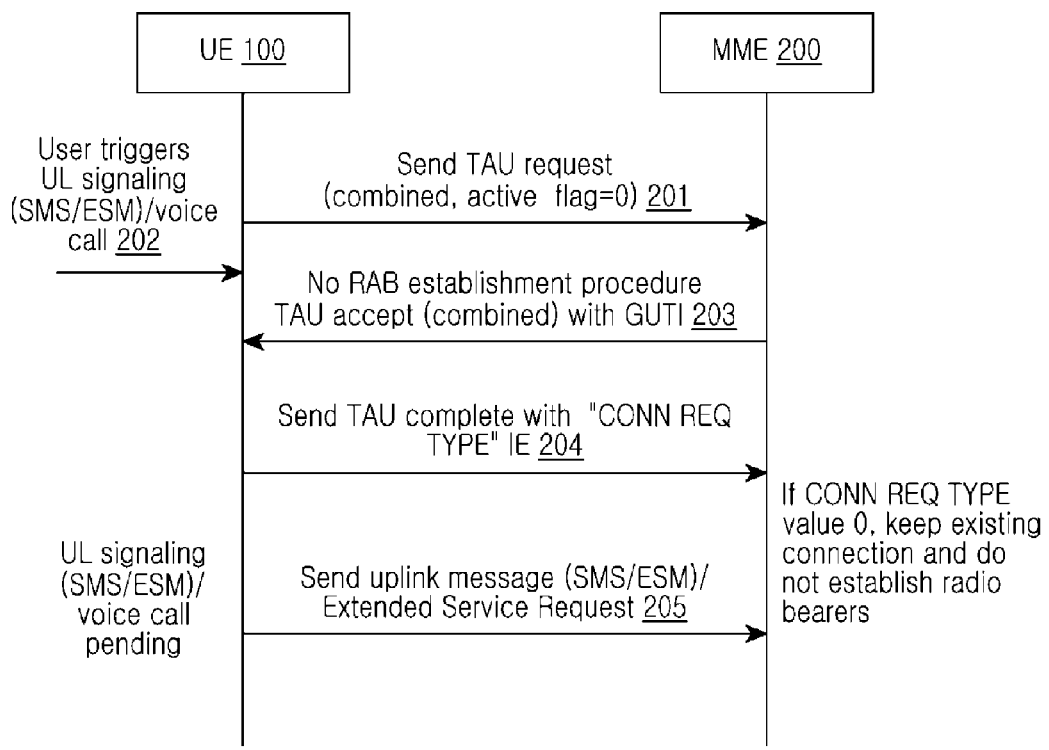
FIG. 2 illustrates a sequence diagram explaining the process of handling pending signaling for UE SMS/call during TAU procedure, according to embodiments as disclosed herein.

FIG. 2 illustrates a sequence diagram explaining the process of handling pending signaling for UE SMS/call during TAU procedure, according to embodiments as disclosed herein. As depicted in the sequence diagram, the UE 100, sends (201) TAU request (combined (PS/CS), active flag=0) to the Mobility Management Entity (MME) 200. The MME is the key control-node for the LTE access-network. It is responsible for idle mode UE (User Equipment) tracking and paging procedure including retransmissions. MME is involved in the bearer activation/deactivation process and is also responsible for choosing the Serving Gateway (SGW) for a UE at the initial attach and at time of intra-LTE handover involving Core Network (CN) node relocation. Then the user triggers (202) either uplink (UL) signaling (SMS/ESM)/voice call in the UE 100. ESM (EPS Session Management) protocol provides procedures for the handling of EPS bearer contexts. There is no RAB establishment procedure during this time. Further, the MME 200 on receiving the TAU request from the UE 100, sends (203) TAU accept (combined) with Globally Unique Temporary Identity (GUTI). GUTI is an unambiguous identification of the UE that does not reveal the UE or the user's permanent identity in the Evolved Packet System (EPS). It also allows the identification of the Mobility Management Entity (MME) and network. It can be used by the network and the UE to establish the UE's identity during signaling between them in the EPS. On receiving the TAU accept from the MME 200, UE 100 sends (204) TAU complete with "CONN REQ TYPE" IE to the MME 200. This TAU complete is sent since there is some pending operation in the UE. Based on the pending operation whether signaling or data, UE sends the TAU complete with corresponding IE. After receiving the TAU complete from UE 100, MME 200 checks the IE sent in the message. If the "CONN REQ TYPE" IE value is '0', then the MME 200 keep existing connection and do not establish radio bearers. Still the UL signaling (SMS/ESM)/voice call is pending in the UE 100. Then the UE sends (205) uplink message (SMS/ESM)//Extended Service Request (ESR) to the MME 200. ESR is specially defined for voice call. By this user can continue to perform UL signaling (ESM/SMS)/voice call in existing connection. This reduces the delay in connection establishment to get the service.

Figure 3:
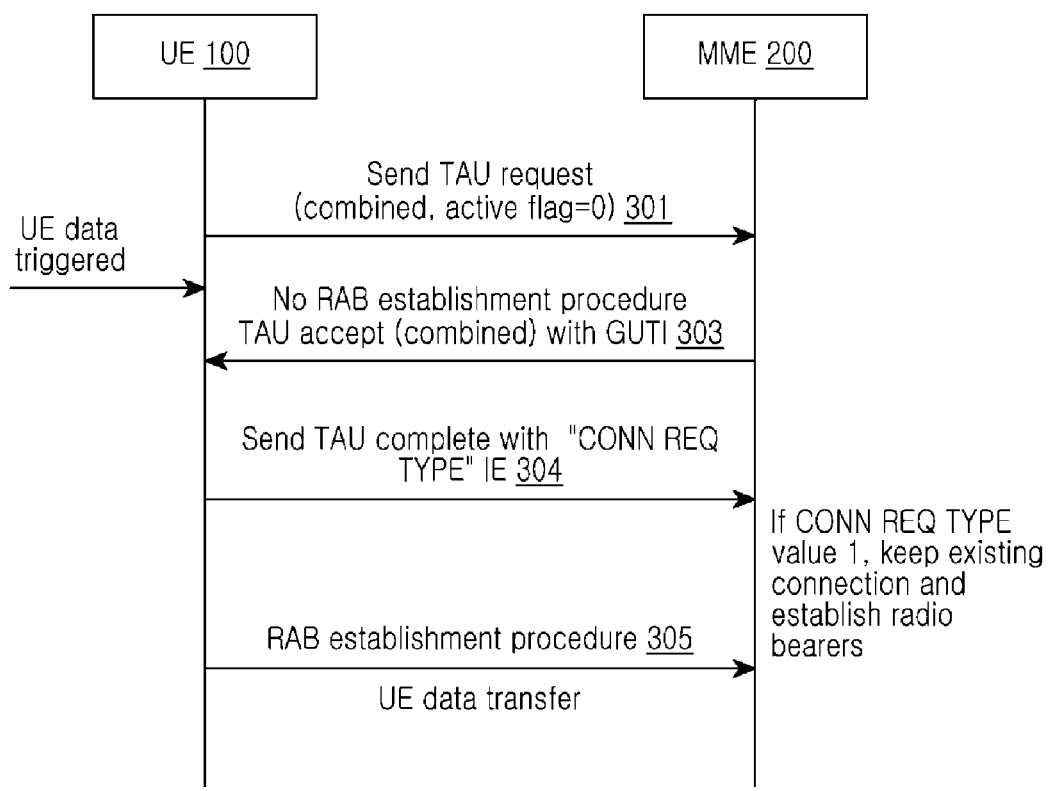
FIG. 3 illustrates the sequence diagram explaining the process of handling pending data during TAU procedure, according to embodiments as disclosed herein.

FIG. 3 illustrates the sequence diagram explaining the process of handling pending data during TAU procedure, according to embodiments as disclosed herein. As depicted in the sequence diagram, the UE 100, sends (301) TAU request (combined, active flag=0) to the Mobility Management Entity (MME) 200. Then the user triggers (202) either data in the UE 100. There is no RAB establishment procedure during this time. Further, the MME 200 on receiving the TAU request from the UE 100, sends (303) TAU accept (combined) with Globally Unique Temporary Identity (GUTI). On receiving the TAU accept from the MME 200, UE 100 sends (304) TAU complete with "CONN REQ TYPE" IE to the MME 200. This TAU complete is sent since there is some pending operation in the UE. Here the pending operation is uplink data, then UE sends the TAU complete with corresponding IE value as '1'. After receiving the TAU complete from UE 100, MME 200 checks the IE sent in the message. If the "CONN REQ TYPE" IE value is '1', then the MME 200 keep existing connection and establishes (305) radio access bearers (RAB) procedure for uplink data. Then the UE receives the data transfer from the MME 200.

Figure 4:
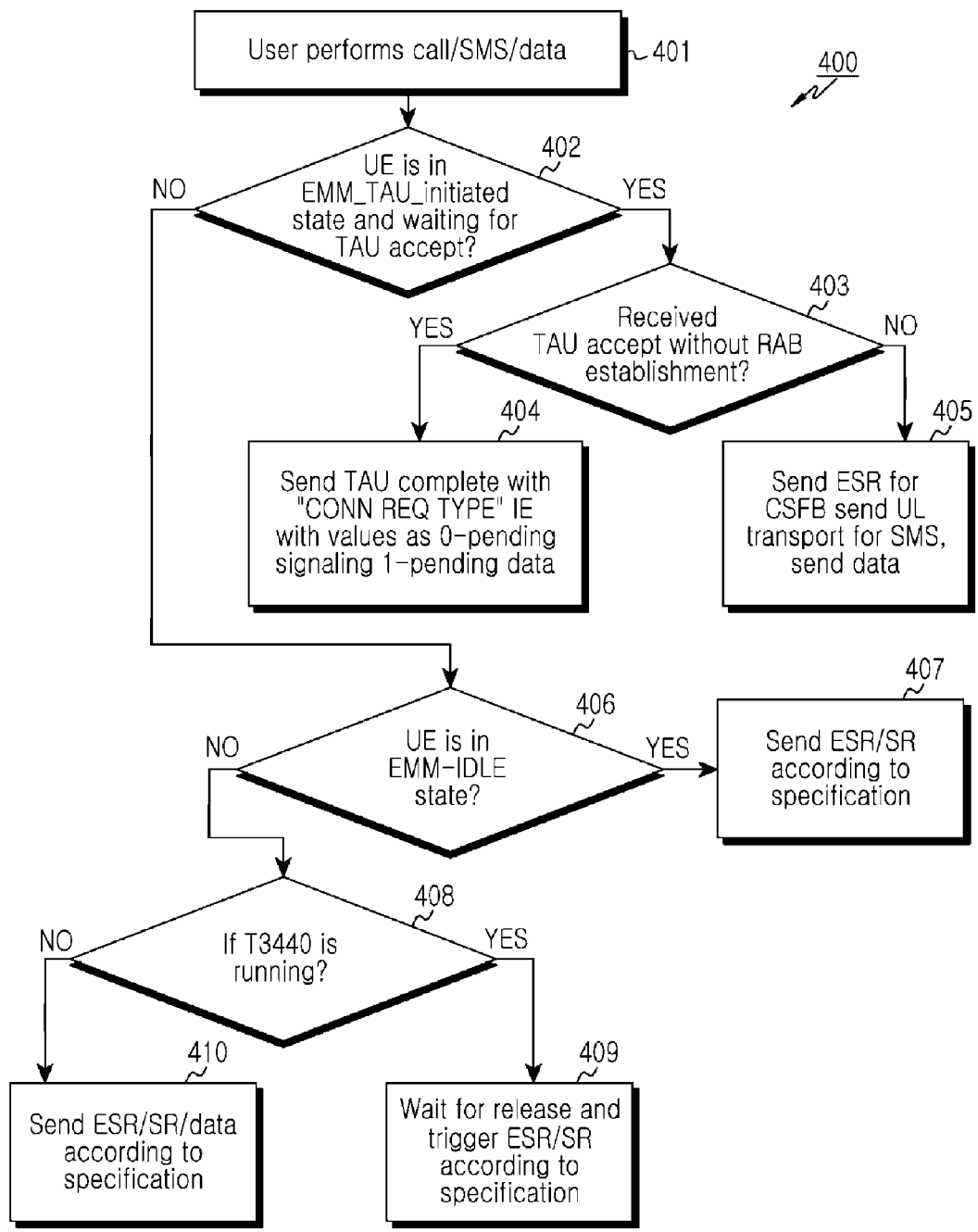
FIG. 4 illustrates a flow diagram explaining the process of handling UE ESM/SMS/voice call/data when UE is waiting for TAU accept, according to embodiments as disclosed herein.

FIG. 4 illustrates a flow diagram explaining the process of handling UE ESM/SMS/voice call/data when UE is waiting for TAU accept, according to embodiments as disclosed herein. As depicted in the flow diagram 400, the user of the UE 100 performs (401) ESM/SMS/voice call/data. Then the method checks (402) whether above procedures triggered while UE 100 is waiting for TAU accept. The method checks whether UE 100 is in EPS Mobility Management (EMM) initiated state and waiting for TAU accept. If the method finds that the UE 100 is in EMM initiated state, then the method checks (403) whether the received TAU accept is without RAB establishment. If the UE received TAU accept without RAB establishment and allocated new GUTI, and then UE 100 sends (404) TAU complete with new IE, "CONN REQ TYPE" with values 0 for pending uplink signaling and 1 for pending uplink data.

If the UE received TAU accept with RAB establishment and allocated new GUTI, then UE 100 follows the below steps:
  i. Send ESR for CSFB (Circuit Switched Fallback) signaling
  ii. Send Uplink NAS transport message for SMS signaling
  iii. Send Data on the RABs directly.

On the other hand, if the UE 100 is not in EMM_TAU_INITIATED and in proper state like EMM_REGISTERED, then the method checks (406) whether UE 100 is in IDLE state or not.

If the method if the UE is in IDLE state, then UE sends (407) ESR for CSFB signaling or SR for SMS signaling or data according to 3GPP specification.

If the method finds that the UE is not in IDLE mode, then UE is in CONNECTED state. Further, the method checks (408) if T3440 is in running state. If yes, then it waits (409) for release and trigger ESR/SR according to specification. If T3440 is not in running state, then it sends (410) ESR/SR/data according to specification. The various actions in flow diagram 400 may be performed in the order presented, in a different order or simultaneously. Further, in some embodiments, some actions listed in FIG. 4 may be omitted.

The embodiments disclosed herein can be implemented through at least one software program running on at least one hardware device and performing network management functions to control the elements. The elements shown in FIGS. 1, 2 and 3 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for operating a user equipment, the method comprising:
    transmitting, to a network node, a tracking area update (TAU) request message via a signaling connection;
    receiving, from the network node, a TAU accept message via the signaling connection according to the TAU request message; and
    transmitting, to the network node, a TAU complete message via the signaling connection according to the TAU accept message,
    wherein the TAU complete message comprises an information element (IE) for requesting to retain the signaling connection.

2. The method of claim 1, wherein the IE is used to retain the signaling connection for the uplink signal triggered after the transmitting of the TAU request message.

3. The method of claim 1, further comprising:
    transmitting a message for an uplink signaling via the signaling connection.

4. The method of claim 1, further comprising:
    performing a signaling for establishing a radio bearer via the signaling connection.

5. The method of claim 1, wherein the IE comprises a value indicating whether to establish a radio bearer or not.

6. The method of claim 5, wherein the value indicates that establishing the radio bearer is not needed if a user triggers at least one of a Message Service (SMS), an Evolved Packet System (EPS) Session Management (ESM) or a call.

7. The method of claim 5, wherein the value indicates that establishing the radio bearer is needed if a user triggers data.

8. A user equipment comprising:
    at least one transceiver; and
    at least one processor operatively coupled to the at least one transceiver,
    wherein the at least one processor is configured to:
      transmit, to a network node, a tracking area update (TAU) request message via a signaling connection,
      receive, from the network node, a TAU accept message via the signaling connection according to the TAU request message, and
      transmit, to the network node, a TAU complete message via the signaling connection according to the TAU accept message, and
    wherein the TAU complete message comprises an information element (IE) for requesting to retain the signaling connection.

9. The user equipment of claim 8, wherein the IE is used to retain signaling connection for the uplink signal triggered after the transmitting of the TAU request message.

10. The user equipment of claim 8, wherein the at least one processor is further configured to transmit a message for an uplink signaling via the signaling connection.

11. The user equipment of claim 8, wherein the at least one processor is further configured to perform a signaling for establishing a radio bearer via the signaling connection.

12. The user equipment of claim 8, wherein the IE comprises a value indicating whether to establish a radio bearer or not.

13. The user equipment of claim 12, wherein the value indicates that establishing the radio bearer is not needed if a user triggers the at least one of a Message Service (SMS), a Evolved Packet System (EPS) Session Management (ESM) or a call.

14. The user equipment of claim 12, wherein the value indicates that establishing the radio bearer is needed if a user triggers data.

15. A method for operating a network node, the method comprising:

receiving, from a user equipment, a tracking area update (TAU) request message via a signaling connection;

transmitting, to the user equipment, a TAU accept message via the signaling connection according to the TAU request message; and receiving, from the user equipment, a TAU complete message via the signaling connection according to the TAU accept message, wherein the TAU complete message comprises an information element (IE) for requesting to retain the signaling connection.

16. The method of claim 15, further comprising:
receiving a message for an uplink signaling via the signaling connection.

17. The method of claim 15, further comprising:
performing a signaling for establishing a radio bearer via the signaling connection.

18. The method of claim 15, wherein the IE comprises a value indicating whether to establish a radio bearer or not.

19. A network node comprising:
at least one transceiver; and
at least one processor operatively coupled to the at least one transceiver,
wherein the at least one processor is configured to:
receive, from a user equipment, a tracking area update (TAU) request message via a signaling connection,
transmit, to the user equipment, a TAU accept message via the signaling connection according to the TAU request message, and
receive, from the user equipment, a TAU complete message via the signaling connection according to the TAU accept message, and
wherein the TAU complete message comprises an information element (IE) for requesting to retain the signaling connection.

20. The network node of claim 19, wherein the at least one processor is further configured to receive a message for an uplink signaling via the signaling connection.

21. The network node of claim 19, wherein the at least one processor is further configured to perform a signaling for establishing a radio bearer via the signaling connection.

22. The network node of claim 19, wherein the IE comprises a value indicating whether to establish a radio bearer or not.

* * * * *